United States Patent [19]
Young

[11] 3,866,222
[45] Feb. 11, 1975

[54] PERSPECTIVE RADAR DISPLAY USING LINEAR VERTICAL SWEEP

[76] Inventor: David W. Young, 627 N. Beachwood Dr., No. Hollywood, Calif. 91506

[22] Filed: Aug. 27, 1973

[21] Appl. No.: 391,561

[52] U.S. Cl. ................................. 343/5 LS, 343/17
[51] Int. Cl. ............................................. G01s 7/20
[58] Field of Search .... 343/5 SC, 5 LS, 5 R, 5 MM, 343/17

[56] References Cited
UNITED STATES PATENTS
3,653,044  3/1972  Breeze et al. .................... 343/5 SC
3,716,860  2/1973  Bechtel ............................ 343/5 SC

*Primary Examiner*—T. H. Tubbesing
*Assistant Examiner*—G. E. Montone
*Attorney, Agent, or Firm*—Ralph B. Pastoriza; Pastoriza & Kelly

[57] ABSTRACT

A perspective radar display is provided on a cathode ray tube having a linear vertical sweep by feeding the video echo return signals to the video input of the cathode ray tube in a non-linear manner as opposed to vertically sweeping in a non-linear manner. Essentially, the video signals are stored linearly with time during a first time interval corresponding to the time interval between successive transmitter triggering pulses defining the radar pulse repetition frequency, and then released to the video input of the cathode ray tube hyperbolically with time over a second time interval measured from the beginning to the end of a vertical sweep so that the signals are passed to the cathode ray tube at a faster rate during the later portion of the sweep as compared to the earlier portion to thereby provide a perspective display.

7 Claims, 5 Drawing Figures sion.
PERSPECTIVE RADAR DISPLAY USING LINEAR VERTICAL SWEEP This invention relates to perspective radar particularly of the type wholly contained within an aircraft and more particularly constitutes an improvement in the perspective radar disclosed and claimed in my co-pending application Ser. No. 847,121 filed Aug. 4, 1969 and entitled AIRCARFT CONTAINED PERSPECTIVE RADAR/DISPLAY AND GUIDANCE FOR APPROACH AND LANDING, now U.S. Pat. No. 3,778,821 issued Dec. 11, 1973.

BACKGROUND OF THE INVENTION

In my above mentioned co-pending patent application, there is disclosed a perspective radar system wherein a perspective display is provided by providing a non-linear vertical sweep for the display cathode ray tube. The non-linear vertical sweep follows a hyperbolic function such that the sweep starts out quite rapidly and then slows down towards the upper end of the display tube. As a consequence, echo return signals from far away objects are spaced closer together as they appear on the display screen than echo return signals from nearer objects thereby providing a perspective display as opposed to the types of displays from plan position indicator type radars.

While the foregoing arrangement provides for a perspective radar picture, the quality of the picture is somewhat impaired because of the non-linear sweep path of the cathode ray beam. The situation is particularly serious at low altitudes where the vertical sweeping beam must move extremely rapidly at its start resulting in a dim trace at the lower portion of the tube below that which would be provided by normal TV. On the other hand, where the vertical sweep is moving slowly at the upper portion of the display tube, excessive brightness occurs if the brightness control is turned up sufficiently to render the initial portions of the trace visible.

Even more serious is the large bandwidth and high power video amplifier and yoke combination required for a hyperbolic sweep. The high speed of the sweep at low altitudes at the initial portions is such that, as a practical matter, the sweep can not be driven over 4 inches thus limiting the size of the cathode ray tube display screen. As opposed to the large bandwidth and high power video amplifier and yoke combination, the very efficient circuitry and components which have evolved from the continued development of TV, make the linear sweep much more attractive.

Aside from the foregoing problem, the use of a non-linear sweep in the radar cathode ray tube as opposed to a linear type sweep limits the usefulness of the cathode ray tube in other areas besides the size of the display screen. For example, the tube is only useful in displaying the perspective radar picture and cannot be used to simultaneously display alpha-numerics or composite pictures as can be done by split images in conventional television.

BRIEF DESCRIPTION OF THE PRESENT INVENTION

With the foregoing in mind, the present invention contemplates a method and apparatus for providing a perspective radar picture on a radar cathode ray tube wherein a linear sweep is used so that the brightness of the picture is uniform throughout and the size of the display is not limited. Moreover, because the cathode ray tube includes a conventional linear sweep, it is adaptable for use with other input information normally requiring a linear sweep as is the case in television.

Briefly, the perspective display is attained in a cathode ray tube having a linear vertical sweep by storing the video signals linearly with time received during a first time interval determined by the time for the radar pulse to travel to the furthest target of interest and the echo signal to return. Normally, this time interval corresponds to the time interval between successive transmitter triggering pulses defining the pulse repetition frequency (PRF). These stored signals are then released to the video input of the cathode ray tube hyperbolically with time over a second time interval measured from the beginning to the end of the vertical sweep whereby the video signals are passed to the cathode ray tube for display at a faster rate during the later portion of the sweep as compared to the earlier portion to thereby provide the perspective display.

Usually, the second time interval is the same as the first; that is, the vertical sweep operates at the pulse repetition frequency. However, such is not necessary in the present invention since the video signals are stored. If desired, they may be released at a slow rate for display by a correspondingly slowed sweep so that the second interval is longer than the first interval and advantage may be taken of display equipment which can only be used practically with a slow sweep; for example, liquid crystals.

When using the perspective radar display on an aircraft for observing the terrain in front of the aircraft, it will be evident that the amount of "perspective" increases substantially as the altitude of the aircraft above the terrain becomes less and less. For example, if the aircraft is flying at an extremely high altitude, the display has very little perspective and in this respect would be similar to the display of a plan position indicator type radar. On the other hand, when the altitude of the aircraft is quite low as when approaching for a landing, a substantial amount of "perspective" is present.

In view of the above, the invention further contemplates varying the form of the hyperbolic function defining the rate of release of the video signals with changes in altitude of the aircraft to thereby maintain a proper perspective display as the altitude of the aircraft varies.

BRIEF DESCRIPTION OF THE DRAWINGS

A better understanding of the invention will be had by now referring to the accompanying drawings in which.

DETAILED DESCRIPTION OF THE PREFERRED EMBODIMENT

Figure 1:
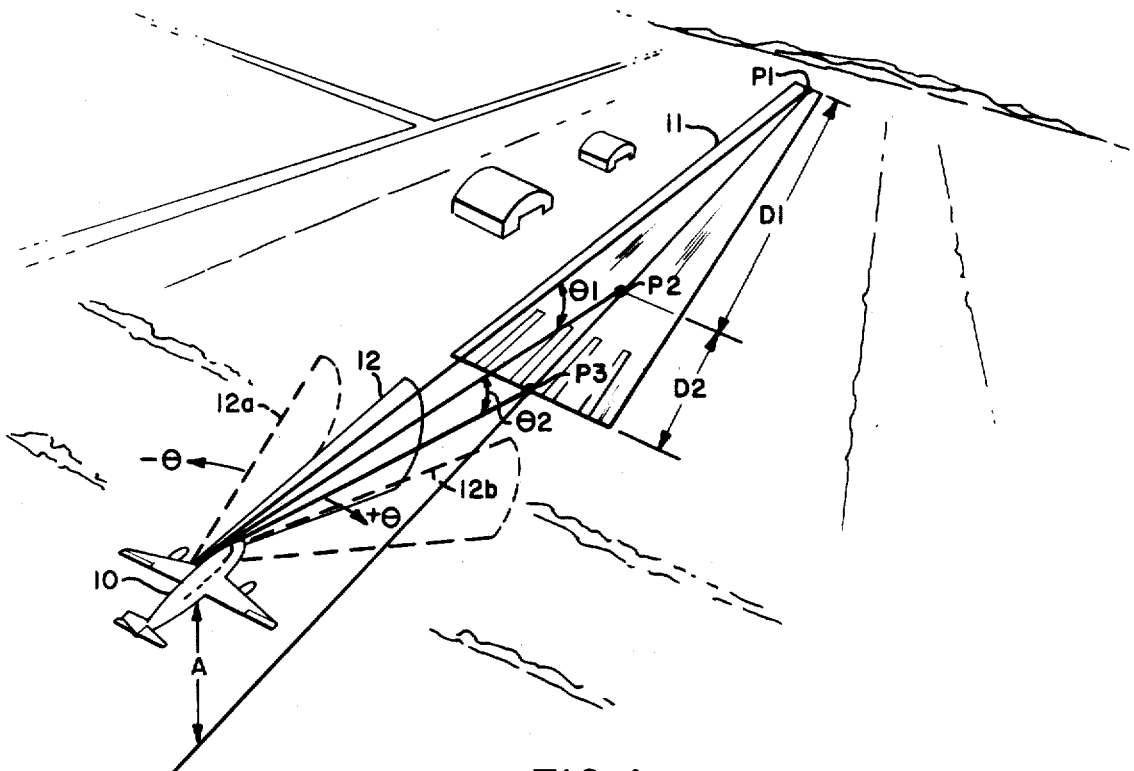
FIG. 1 is a perspective view of an airport complex showing an aircraft equipped with a high resolution rapid scanning radar approaching the runway.

Referring first to FIG. 1 there is shown an aircarft 10 approaching an airport complex including a runway 11. The aircraft 10 is equipped with a high resolution rapid scanning radar providing a beam 12 which is fan-shaped in a vertical plane and arranged to be scanned back and forth in azimuth as indicated by the angle $\phi$ and the dotted lines showing 12a and 12b.

The generation of the fan-shaped beam and the scanning of the beam in azimuth can be accomplished by a ridge scan antenna such as shown and described in my co-pending patent application Ser. No. 353,201 filed Apr. 20, 1973 and entitled RIDGE SCAN ANTENNA now U.S. Pat. No. 3,829,862 issued Aug. 13, 1974. Further, the significance of providing a perspective radar display for the pilot of the aircraft and the manner in which such display is used for approach and landing is fully shown and described in my more recent co-pending patent application Ser. No. 385,534 filed Aug. 3, 1973 and entitled PERSPECTIVE RADAR AIRPORT RECOGNITION AND LANDING GUIDANCE SYSTEM.

Before describing in detail the present invention, the basic principles involved in providing a perspective radar display all as set forth in my first mentioned co-pending application will be briefly reviewed.

In FIG. 1 assume that echo signals are received from three distinct points on the runway 11, these points being designated P1, P2 and P3. The direction of returning echo signals form different angles measured in the vertical plane. For example, let $\theta 1$ be the angle subtended between the point P1 and P2 and let $\theta 2$ be the angle subtended between the points P2 and P3. Further, assume that these angles are equal. Even though these angles are equal, it will be evident that the distance measured between the point P1 and P2 along the runway as designated D1 and the distance between the points P2 and P3 as shown at D2 are not at all equal. It will therefore take considerably longer for an echo signal to be received from the point P1 relative to the point P2 than for an echo signal to be received from the point P2 relative to the point P3.

As a consequence of the foregoing, on a conventional cathode ray tube screen having a vertical sweep encompassing a vertical slice of the terrain corresponding to the fan-shaped beam 12, the return echo signals corresponding to the points P1, P2 and P3 will assume positions on the screen proportional to the distances D1 and D2 separating the points; that is, the echo return from P1 will be spaced considerably above the echo signal from the point P2 as compared to the position of the echo point P2 relative to the echo point P3. The display accordingly would be similar to that from a conventional PPI display and the runway would not appear in true perspective.

Figure 2:
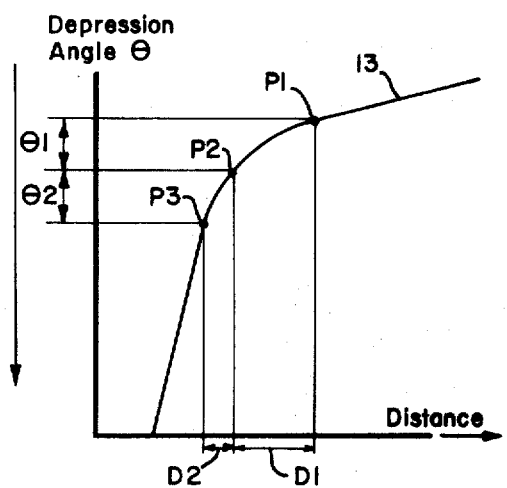
FIG. 2 shows a curve following a hyperbolic function useful in explaining basic principles involved in attaining a perspective display on the radar in the aircarft of FIG. 1.

The relationship between the depression angle $\theta$ and the various distances along the runway is depicted in FIG. 2 by the curve 13. Thus where $\theta 1$ is equal to $\theta 2$, from the curve 13 the distance D1 is substantially greater than the distance D2 which is actually the real situation. In order that the displayed picture appear in true perspective, it is therefore necessary to cause the echo signals from further away points to appear closer together than would be their actual separation distance.

The foregoing is accomplished in known perspective radar systems such as set forth in my first mentioned co-pending patent application by making the vertical sweep of the cathode ray tube non-linear. Thus, by moving the sweep more slowly at it's upper portion on the display screen, the further away echo signals will appear closer to each other than would be the case if the beam were sweeping at it's normal speed. A perspective picture thus results.

The shape of the particular curve 13 is that of a hyperbolic function and it's form must be varied in accordance with changes in the altitude of the aircraft in order to maintain a true perspective display.

Figure 3:
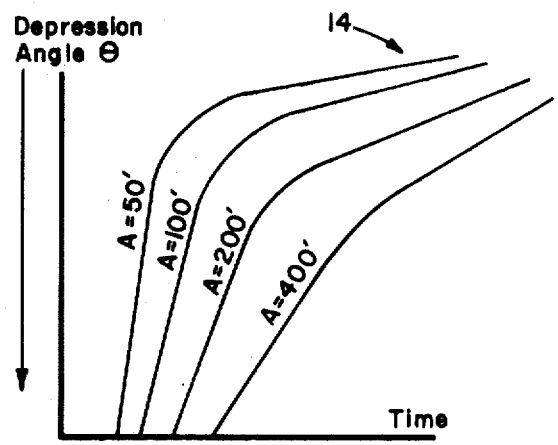
FIG. 3 illustrates the manner in which the form of the hyperbolic function varies with different altitudes of the aircraft.

FIG. 3 illustrates at 14 a family of such hyperbolic functions illustrating how they would change for different given altitudes A of the aircraft. It will be noted that the higher the altitude, the more nearly does the curve approach a linear curve. This is to be expected since the degree of "perspective" decreases with increasing height and increases with decreasing height.

Figure 4:
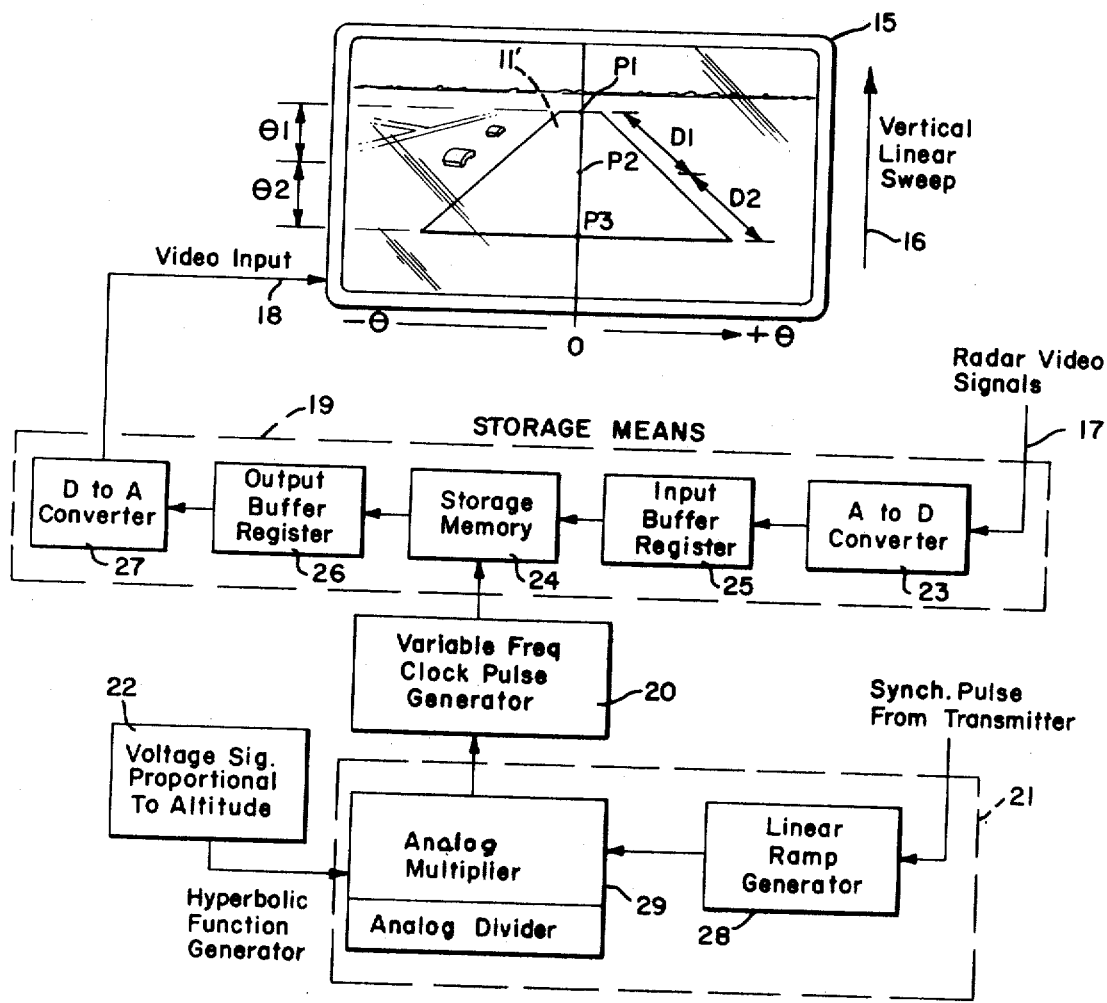
FIG. 4 is a front elevational view of a radar display screen in the aircraft of FIG. 1 together with a block diagram showing basic circuit components to provide a perspective display in accord with the present invention; and, FIG. 5 illustrates several graphs and pulse diagrams useful in explaining the operation of the circuit of FIG. 4.

Referring now to FIG. 4 there is shown the display screen of the cathode ray tube 15 of the radar in the aircraft 10 of FIG. 1 wherein there is illustrated a perspective view of the runway indicated at 11'. In true perspective, it will be noted that the vertical spacing between points P1 and P2 and between the points P2 and P3 appear about equal when measured on the surface of the display screen in a vertical direction. This spacing would be correct for the particular situation described in FIGS. 1 and 2 in order to show the runway in true perspective, it being appreciated that the actual distances measured along the runway as indicated at D1 and D2 are different.

It can also be appreciated from the display on the tube 15 that by moving the vertical sweep indicated by the arrow 16 in a non-linear manner to follow the hyperbolic function shown in FIG. 2, the sweep will slow down towards the top of the screen and thereby cause the proper spacing between the echo signals P1, P2 and P3 to result in the perspective appearance of the picture.

In accord with the present invention, an identical perspective picture is provided on the cathode ray tube 15 but the vertical sweep indicated by the arrow 16 is absolutely linear. As mentioned using a linear sweep has the advantage that the picture brightness is uniform from bottom to top, and the screen size is not limited as is the case with hyperbolic sweeps particularly at low altitudes.

The manner in which the perspective display using a vertical linear sweep is achieved will now be understood by referring to the block diagram below the cathode ray tube display 15. Essentially, rather than feeding the return echo video signals on a line 17 normally to the cathode ray tube video input 18, there is interposed a storage means encompassed within the dashed line 19 which stoage means receives and stores the video signals linearly with time, received during a first time interval measured between successive transmitter triggering pulses defining the pulse repetition frequency of the radar. A storage signal releasing means in the form of a variable frequency clock pulse generator 20 in turn is connected to control the release of the video signals from the storage means hyperbolically with time over a second time interval measured from the beginning to the end of the vertical sweep. The hyperbolic function controlling the time release relationship is provided by a hyperbolic function generating means encompassed generally within the dash line 21 connected to the variable frequency clock pulse generator 20. The form of the generated hyperbolic function is controlled by a voltage signal proportional to altitude which is provided by the block 22.

With the foregoing arrangement, a linear vertical sweep is used for the cathode ray tube but the appearance of the echo signals is controlled varying the rate that the signals are released from the storage means which, as stated, varies hyperbolically. Accordingly, the desired perspective display shown on the display tube 15 can be effected in essence by hyperbolically controlling the video signal rather than hyperbolically controlling the vertical sweep.

Considering now in further detail the block diagram of FIG. 4 it will be noted that the storage means includes an analog to digital converter 23 for receiving the video signals and converting to a digital data representation of the signals. A storage memory circuit 24 has an input buffer register 25 receiving for storage the digital data from the analog to digital converter 23 and an output buffer register 26 for releasing the stored digital data when triggered by the variable frequency clock pulse generator 20. A digital to analog converter circuit 27 in turn converts back the digital data into the video signals for feeding to the video input 18 of the cathode ray tube 15.

The variable frequency clock pulse generator is characterized in that it is responsive to a voltage signal to provide output pulses for triggering the storage means wherein the rate of pulse generation is proportional to the value of the voltage signal. This voltage signal is in the form of a hyperbolic function suitable shaped in accord with the altitude of the aircraft as provided by the hyperbolic function generating means 21.

Referring specifically to the hyperbolic generating means, this portion of the circuit includes a linear ramp generator 28 which, in the embodiment shown, is triggered by a synchronizing pulse from the radar transmitter. In this respect, and in the embodiment shown this synchronizing pulse corresponds to the starting of the vertical sweep in the cathode ray tube. The resulting generated ramp voltage is then passed to an analog multiplier/divider means 29 which functions to shape the ramp voltage to provide a hyperbolic voltage signal to the input of the variable frequency clock pulse generator 20. It is in the analog multiplier/divider means 29 that the hyperbolic voltage signal is varied in form in accord with the altitude of the aircraft by the means 22.

Figure 5:
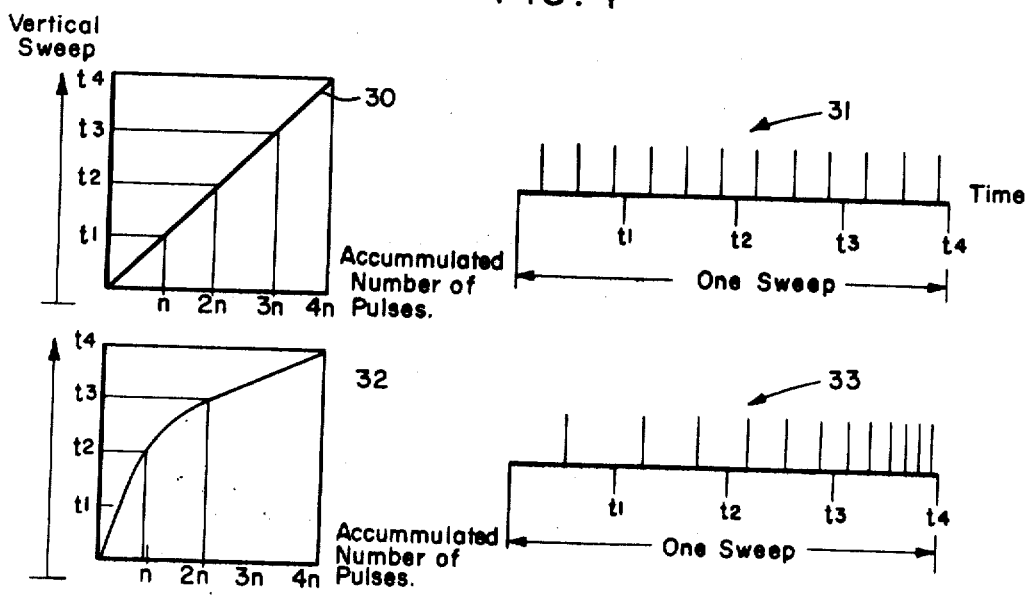

Referring now to the various curves and pulse wave forms illustrated in FIG. 5, the first curve 30 represents the manner in which video signals received on the line 17 of FIG. 4 are stored in the storage means 19. Essentially, the storage of the data is linear with time over a first time interval measured between successive PRF pulses which in the example corresponds to one linear sweep. This time interval is indicated on the ordinance of the graph 30 and is broken up into equal time segments $t1$, $t2$, $t3$, and $t4$. The abscissa represents the accumulated number of pulses making up the digital data from the analog to digital converter 23 of FIG. 4 that is stored.

Such digital data might for example take the form of the series of uniform pulses 31 shown to the right of the graph 30.

Referring now to the lower graph 32 of FIG. 5, the manner in which the stored data is released is shown and it will be evident that the release of the data is non-linear as opposed to the linear storage thereof. The non-linear rate of release defined by the curve 32 follows a hyperbolic function over a second time interval measured between the beginning and end of a vertical sweep. Thus, in the example, the first and second time intervals are equal.

Referring to the pulses 33 to the right of the graph 32 in FIG. 5, the non-linear release thereof will be evident. Thus, the stored data is released slowly at first and then released more rapidly towards the end of the sweep.

When the digital data representing the video signals is converted back into the video signals by the digital to analog converter 27 of FIG. 4 the resulting video signals passed to the input 18 are the same as the video signals received on the line 17 but occur at positions on the display screen to result in the illustrated perspective display.

Thus, the time spacing of the video signals representing further away targets such as the point P1 is caused to be less than the time spacing between the video signals that are not as far away such as the point P3. Feeding of the signals hyperbolically in time thus results in a perspective picture the same as though the vertical linear sweep were varied hyperbolically in time but without the disadvantages associated with obtaining and using a non-linear vertical sweep.

The curve 32 shown in FIG. 5 is essentially a hyperbolic function and it will be understood that it's form will change with changes in altitude in the same manner that the heretofore discribed non-linear vertical sweep was changed as illustrated in FIG. 3.

Because a finite amount of time is required for the storage of video signals, they will not actually be displayed on the vertical sweep which corresponds to the generation of the fan-shaped beam pulse resulting in the echo signals. Rather, the video signals will be fed out for display on the next subsequent vertical linear sweep or could be even displayed on a subsequent vertical sweep after that. However, since there are provided a very large number of vertical sweeps per unit time as compared to the rate at which the vertical sweep beam is scanned in azimuth, there will not be any appreciable displacement in azimuth of the signals on the display screen.

It will be understood that while one set of video signals is being displayed resulting from a previous vertical linear sweep, a next set of video signals may simultaneously be stored so that there need be no wasted vertical sweeps wherein targets are not present.

In the block diagram portion of FIG. 4, present equipment available for the storage portion 19 could include BIOMATION Model 610 Transient Recorder, Palo Alto, California or Colorado Video, Inc. VIDEO CONVERTER 201, Boulder, Colorado. The analog multiplier/divider 29 may comprise INTRONICS Model M501, Newton, Massachusetts.

It will be appreciated from the foregoing description that the present invention permits the use of a cathode ray tube having a vertical linear sweep and yet provides a perspective display. All of the advantages accruing from the use of tubes having a linear sweep pattern such as in conventional television tubes are thus available. For example, other information which requires a vertical sweep, can be simultaneously displayed on the cathode ray tube 15 along with the perspective radar picture. Thus any type of data may be super-imposed on the picture such as altitude readings, rate of descent information other alpha numerics, and the like. In addition, split images as is done in conventional television becomes feasible.

More significant is that the stored video signals may be released at a slow rate so that the second time interval is longer than the first time interval during which storage takes place. Releasing the signals at a slower rate reduces the "writing" rate so that large display cathode ray tubes using a corresponding slowed vertical sweep can be used. In fact other read-out devices normally incapable of handling fast writing become feasible as read-out means in the perspective radar system, and in this respect, it would be feasible to use a hyperbolic linear sweep which could take place much more slowly for displaying the video signals wherein the signals are released linearly with time but at a much slower rate.

Finally, the digital storage of the signals and the use of a slower read-out simplifies video digital analysis and permits increasing the signal to noise ratio as well as providing other inherent advantages.

The present invention makes the presentation of perspective radar compatible with the slow response times of display types and sizes, a compatibility heretofore not feasible.

What is claimed is:

1. A method of providing a perspective radar display of terrain in front of an aircraft equipped with a high resolution rapid scanning radar having a cathode ray tube with a vertical sweep for displaying video return echo signals along the sweep path, comprising the steps of:
   a. storing the video signals linearly with time, received during a first interval corresponding to the time interval between successive transmitter triggering pulses defining the radar pulse repetition frequency;
   b. releasing the stored video signals in accord with a given function over a second time interval measured from the beginning to the end of a vertical sweep; and
   c. varying the form of the function defining the rate of release of the video signals with changes in altitude of the aircraft
whereby the video signals are passed to the cathode ray tube and displayed at a faster rate during the later portion of the sweep as compared to the earlier portion to thereby provide a perspective display and whereby a desired perspective display is maintained as the altitude of the aircraft varies.

2. The method of claim 1, in which the vertical sweep for displaying the video signals is linear and said given function is a hyperbolic function.

3. The method of claim 1 in which said second given time interval is longer than said first given time interval so that said vertical sweep may be operated at a slower rate and the "writing" of the video signals correspondingly slowed.

4. An apparatus for providing a perspective radar display of terrain in front of an aircraft, comprising, in combination:
   a. a high resolution rapid scanning radar having a cathode ray tube with a vertical sweep and a video signal input for displaying video return echo signals along the sweep path;
   b. a storage means having an input connected to receive said video echo signals and an output connected to the video input of said cathode ray tube, said storage means receiving and storing video signals linearly with time received during a first time interval corresponding to the time interval between successive transmitter triggering pulses defining the pulse repetition frequency of said radar;
   c. storage signal releasing means connected to control the release of the video signals from the storage means to the video input of said cathode ray tube;
   d. function generating means connected to said storage signal releasing means to release the stored video signals in accord with a given function over a second time interval as measured from the beginning to the end of a vertical sweep; and
   e. means for supplying a signal to said function generating means proportional to the altitude of said aircraft for varying the form of said function defining the rate of release of the video signals with changes in altitude of the aircraft
whereby the video signals are displayed at a faster rate during the later portion of the sweep as compared to an earlier portion to provide a perspective display and whereby a desired perspective display is maintained as the altitude of the aircraft varies.

5. An apparatus according to claim 4, in which the vertical sweep for displaying the video signals is linear and said given function is a hyperbolic function.

6. An apparatus according to claim 5, in which said storage means includes an analog to digital converter for receiving said video echo signals and converting them to a digital data representation of the signals; a storage memory circuit having an input buffer register receiving for storage said digital data and an output buffer register for releasing the stored digital data; and a digital to analog converter circuit connected between said output buffer register and the video input of said cathode ray tube, said storage signal releasing means comprising a variable frequency clock pulse generator responsive to a voltage signal to provide output pulses to said storage means wherein the rate of pulse generation is proportional to the value of said voltage signal, the hyperbolic function generating means including a linear ramp generator connected to receive a synchronizing pulse corresponding to the starting of the vertical sweep in said cathode ray tube to generate a ramp voltage; an analog multiplier/divider means receiving said ramp voltage and shaping it to provide a hyperbolic voltage signal to the input of said clock pulse generator, said storage means releasing said digital data at a rate proportional to the varying frequency of the output clock pulses supplied thereto.

7. An apparatus according to claim 6, in which said second time interval is equal to said first time interval.

* * * * *